S. R. PARKHURST.
Mechanism for Forming Laps for Combing
and Carding Machines.
No. 216,103. Patented June 3, 1879.
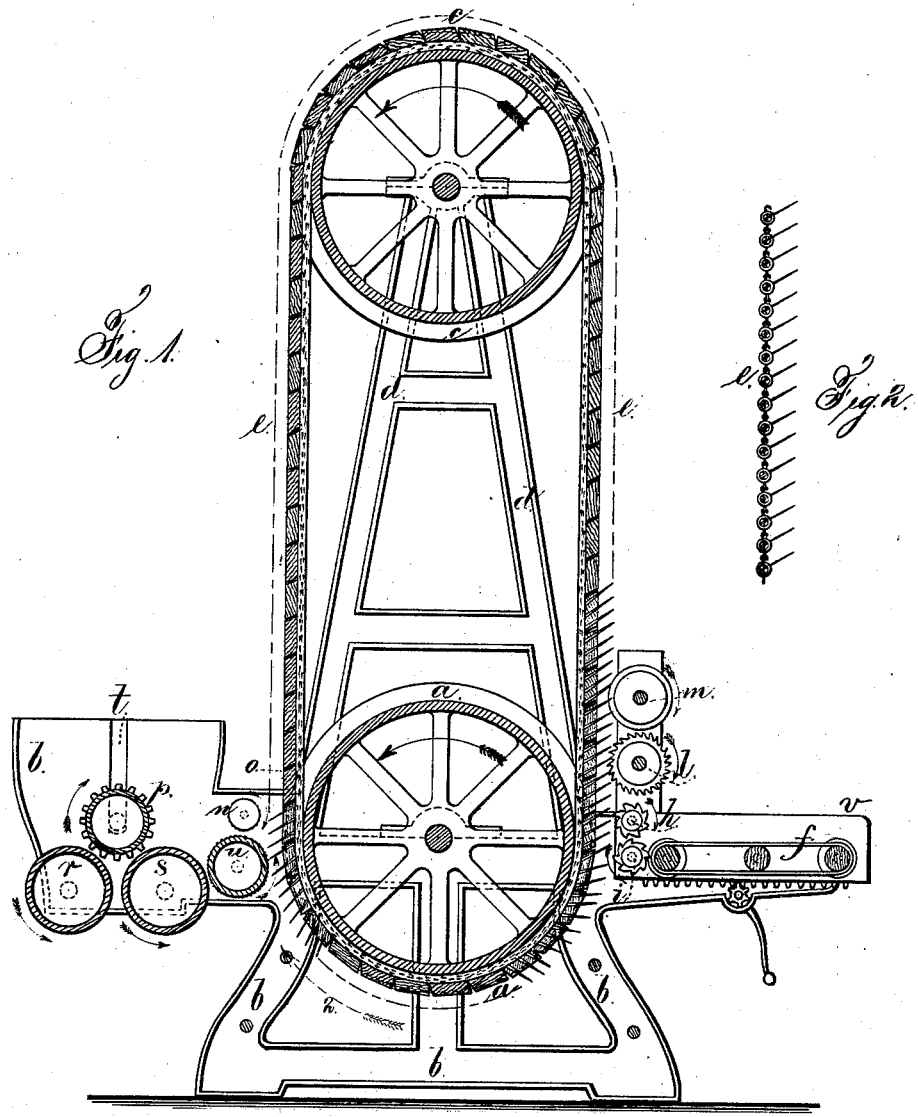

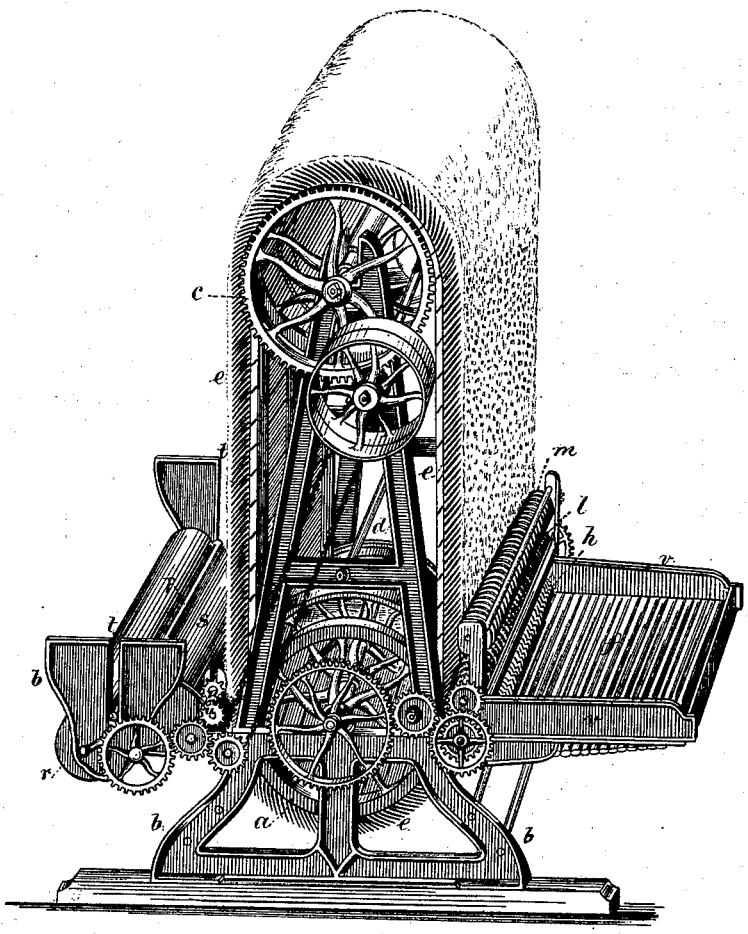

UNITED STATES PATENT OFFICE.

STEPHEN R. PARKHURST, OF MONT CLAIR, NEW JERSEY, ASSIGNOR TO EMILY R. PARKHURST, OF SAME PLACE.

IMPROVEMENT IN MECHANISMS FOR FORMING LAPS FOR COMBING AND CARDING MACHINES.

Specification forming part of Letters Patent No. 216,103, dated June 3, 1879; application filed September 16, 1878.

*To all whom it may concern:*

Be it known that I, STEPHEN R. PARKHURST, of Mont Clair, in the county of Essex and State of New Jersey, have invented an Improvement in Mechanisms for Forming Laps for Combing and Carding Machines, of which the following is a specification.

The object of this invention is to comb the wool and form a bat that is caused to accumulate until it is of the proper size and weight. It is then wound off upon a roll or reel that is adapted to use in feeding, carding, or combing machinery.

By my improvement the bat is rendered very uniform, and the successive layers are slightly felted together, so as to be in the proper condition for feeding the carding-machine regularly.

In rope machinery it is usual to wind the hemp around a cylinder of teeth, and then stop the cylinder and take off the layer and feed it to the combing and drawing apparatus. Such a cylinder of teeth is not adapted to wool, because the layers are not interlocked or felted, and if an attempt were made to use wool in such machines the same would fall from the under side of the cylinder or be thrown off by the centrifugal force.

I make use of an endless belt or chain running vertically, or nearly so, over two drums, one above the other, and provided with teeth; and to this belt the wool is supplied by an apron and feed-rollers. There is also a cylinder that serves to comb the fiber as it is supplied to the bat. I employ with the endless belt or chain of teeth a pair of delivery-rollers and a winding roller or reel, so that the bat, when complete, will be removed from the belt and wound up for future use in supplying a carding or other machine.

In the drawings I have represented the improvement by a vertical section, Figure 1. Fig. 2 is a section of the belt in a modified form, and Fig. 3 represents the gearing and connections by a perspective view.

The frame of the machine is of any suitable character. I have shown the cylinder or drum $a$ supported by the frames $b$, and the drum $c$ as supported by an extension, $d$, of the frame $b$; or it may be made in any other suitable manner.

The endless belt or chain $e$ passes below the drum $a$ and over the drum $c$. It is provided with projecting teeth somewhat like card-teeth, but sufficiently long to contain below the points of the teeth the wool forming the bat. These teeth are by preference set in slats or lags, which are connected by the said chain or belt.

In Fig. 2 the endless belt of teeth is represented as made of transverse metal tubes, into which the teeth are secured, and these tubes are hinged together by wires with eyes that interlock, as shown, so as to form an endless metal belt that will pass freely around the pulleys or drums $a$ and $c$, which drums may be made with notched peripheries to receive the tubes.

The feed-apron $f$ receives the wool in the usual manner and passes it to the toothed feed-rollers $h$ $i$, which not only feed the wool to the teeth of the endless belt, but hold such wool and cause the teeth to comb out the wool gradually. The teeth of the endless belt $e$ draw the wool from between the teeth of the lower feed-roller, $i$, and upper feed-roller, $h$, and at the same time keep the teeth of the roller $i$ from becoming clogged; but it is necessary to use the toothed cylinder $l$, revolving as indicated by the arrow, to comb the wool out of the teeth of the feed-roller $h$ and bring the fiber to the belt $e$, which takes the same from the cylinder $l$ with a combing action.

I employ a roller of rings at $m$, or a brush revolving as indicated by the arrow, to keep the teeth of the cylinder $l$ clean and insure the passage of all the wool in a combed condition to the belt $e$.

It will be apparent that the wool accumulates upon the belt $e$ in successive layers as the same revolves and combs the wool into its teeth. The wool, however, is slightly felted together, sufficiently to cause the layers to adhere. This results from the bending and flattening of the belt as the same travels over the pulleys. The bending of the belt at the parts around the drums $a$ and $c$ causes a strain on the fibers, and then the straightening of the belt between the two pulleys relieves that strain, whereby the layers of wool are slightly felted, so that the wool will not fall away from the teeth. This felting operation is further promoted by the action of the teeth of the belt. Upon the straight parts of the belt the teeth are parallel to each other. The teeth of the belt, where the latter is upon the surfaces of the pulleys, diverge; hence there is a change of distance between the teeth-points on the belt where the belt is bent in passing upon and off the pulleys, and this acts to felt the wool sufficiently to cause the fibers of the bat to adhere together while upon the belt and while being removed therefrom. According to the length of the teeth on the endless belt $e$, and the quantity of wool that is supplied, the bat that accumulates upon such belt is more or less dense and of greater or less thickness. When the bat has accumulated to the required extent upon the belt of teeth the machine is stopped, the bat of fibers is separated at a convenient place, preferably at about the line $o$, and the lower edge of the bat is passed between the rollers $n$ $u$ to the winding-up roller $p$, that rests upon the rollers $r$ $s$. These rollers $n$ $u$ $r$ $s$ are now revolved in the direction of the arrows, and the belt $e$ is driven backwardly in the direction of the arrow 2, and the bat is drawn off the teeth freely and wound upon the roller or reel $p$.

It is preferable to provide slotted guides $t$ in the frame $b$ for the journals of the roller $p$, so that the same is free to rise as the bat of wool accumulates.

In order to prevent the teeth of the feed-rollers catching in the bat of fiber as it is revolved backwardly and drawn off, the belt-feeding rollers and toothed cylinder should be moved away from such belt. This is accomplished by providing a movable frame or support for the journals of said rollers. This frame $v$ is made movable, so as to be set back bodily with the toothed rollers $h$ $i$ $l$ $m$ out of the way of the loose fibers that project from the bat.

Racks upon the frame and pinions upon a cross-shaft may be used to move the sliding frame along, as represented.

By the construction of apparatus before described the bat is rendered very uniform, for the teeth of the belt $e$ that are the most exposed will fill with wool the quickest, and when the teeth are entirely filled the bat will have attained its maximum thickness and be uniform, and hence the bat, as removed to the reel or roller, will be more uniform than in machines where the bat is taken off by a doffer.

The belt $e$ might be composed of longitudinal sections of teeth, so as to divide up the bat into slivers or sections; but usually the bat will be the entire width of the belt.

The pulleys or gearing employed to drive the respective parts are to be of any usual or convenient character.

I claim as my invention—

The combination, with a feeding-apron and toothed rollers, of an endless apron or chain of teeth passing vertically, or nearly so, over the drum $c$ and below the drum $a$, for combing wool, slightly felting the same, and forming a bat, substantially as set forth.

Signed by me this 11th day of September, A. D. 1878.

S. R. PARKHURST.

Witnesses:
GEO. T. PINCKNEY,
HAROLD SERRELL.